Patented Feb. 24, 1948

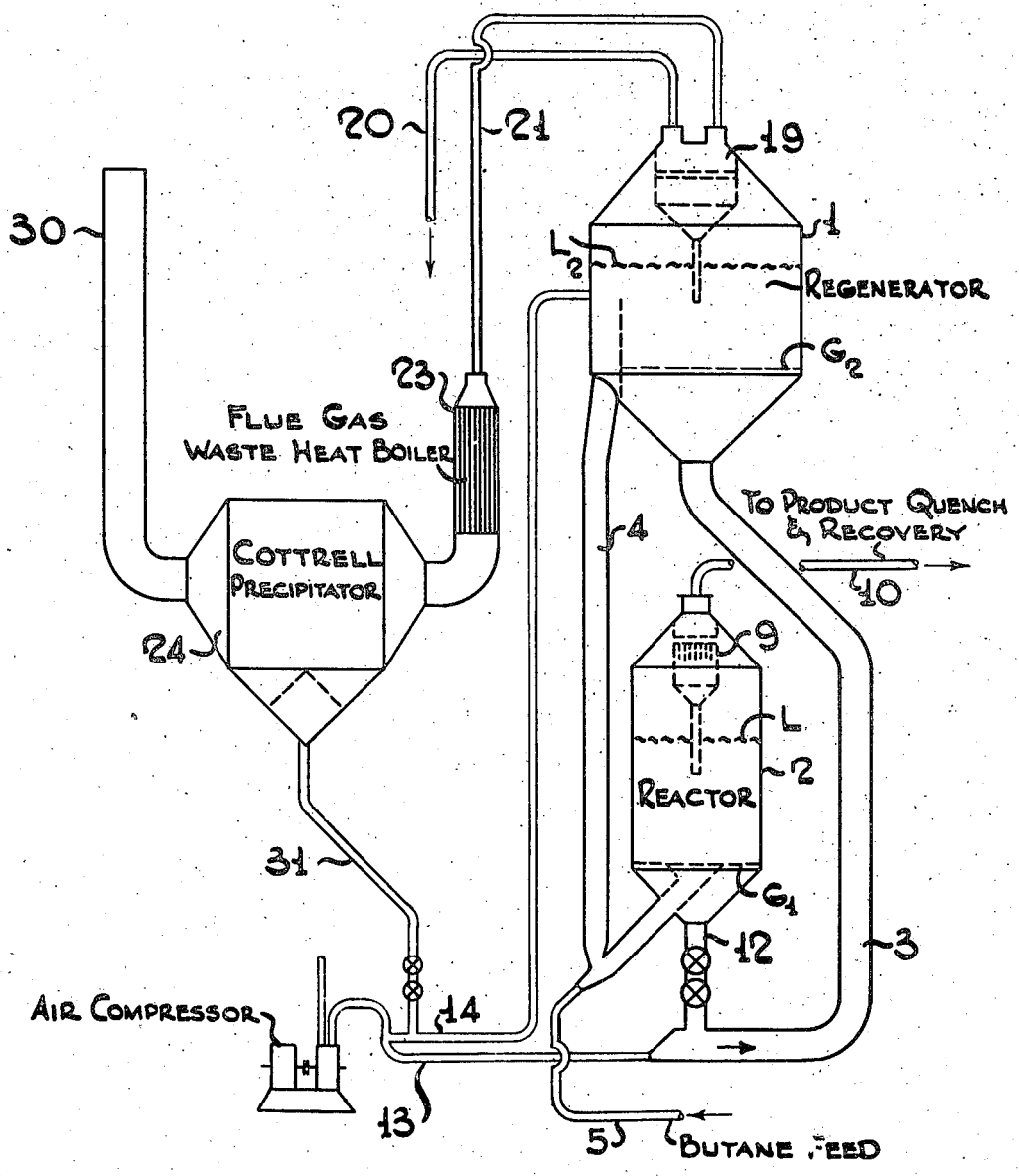

2,436,721

UNITED STATES PATENT OFFICE 2,436,721

METHOD OF DEHYDROGENATING BUTANE

Kenneth C. Laughlin, Wilmington, Del., and Henry J. Ogorzaly, Summit, N. J., assignors to Standard Oil Development Company, a corporation of Delaware Application August 1, 1945, Serial No. 608,322

4 Claims. (Cl. 260—683.3)

The novel features of our invention are fully disclosed in the ensuing specification and claims.

The main object of the present invention is to improve the regeneration process of hydrogenation or dehydrogenation catalysts.

A second object of the present invention is to provide an improved regeneration process for a powdered catalyst employed in the so-called "fluid catalyst" type of operation in order to secure to said regenerated catalyst maximum activity and adapted to promote the desired reaction, i. e., to obtain optimum selectivity as it enters the productive phase of a dehydrogenation or hydrogenation reaction.

We have found that the regeneration of a fouled dehydrogenation catalyst such as a chromium oxide or molybdenum oxide on activated alumina is influenced by the manner in which it is regenerated in the following way.

When we regenerated the catalyst with undiluted air, we have found that the regeneration fumes issuing from the regeneration zone contain $CO_2$ and free oxygen together with other constituents such as water vapor and nitrogen, etc. In particular, we have found that when the $CO_2$ content of the fumes issuing from the regeneration zone contains less than 10 volume per cent of $CO_2$, that the regenerated catalyst subsequently employed in the productive phase gave better results from the standpoint of activity and product distribution, that is, per cent of desired product. It is a principal feature of our invention, therefore, that the plant should be designed to provide means for supplying that amount of air to the catalyst undergoing regeneration to insure the formation of regeneration fumes containing not more than 10 volume per cent of $CO_2$, and preferably less than 5% of $CO_2$. Of course, the experienced engineer will be able to design such a plant for he will know how much carbon will be formed on the catalyst during the productive phase and using this information he will be enabled to design the regeneration equipment to provide means for supplying the proper amount of air to the regeneration zone to burn the carbon on the catalyst and to cause the issuance of a flue gas from the regeneration zone containing $CO_2$ diluted to the extent indicated. For example, suppose the catalyst actually contained 2% carbon. For each 100 pounds of catalyst, therefore, there would be two pounds of carbon or 1/6 of a pound mol. To burn this quantity of coke would theoretically require (assuming 100% carbon) 5⅓ pounds of oxygen or about 23 pounds of air. It is obvious that using an adequate excess of air over and above the amount theoretically required to completely burn the coke to carbon dioxide will insure a lesser amount of $CO_2$ than would correspond to 10 volume per cent of the total volume of the issuing regeneration fumes.

In the accompanying drawing we have shown diagrammatically apparatus depicting a portion of a dehydrogenation plant in which, say, butane may be converted to butylene and other embodiments of our invention may be carried into effect.

We shall describe the operation of the portion of the plant shown (the purification and recovery of the crude product not being shown) in detail. A "fluid catalyst" is to be employed. The catalyst may be a group V or VI metal oxide in a support. Thus, $CrO_3$ or $MoO_3$ supported on "activated" alumina may be used. The catalyst may contain 10% $MoO_3$, the remainder alumina. Also, it is a powder having a size of from about 200 to 100 mesh. In the drawing regenerated catalyst flows from regenerator 1 via standpipe 4 into butane feed line 5 and is thereafter carried in suspension into reactor 2 where it forms a "fluid" mass of catalyst in the gas, i. e., a dense suspension of the catalyst in the gas is formed by controlling the gas velocity within the limits of from about ½ to 10 feet per second, preferably from 1 to 3 feet per second. Process conditions will be given hereinafter. The butane undergoes dehydrogenation and the product for recovery exits via line 10 after passage through "cyclone" 9 wherein entrained catalyst is removed by centrifugal action from the gas. The "fluid" mass of catalyst will have an upper dense phase level at some point L, above which the suspension contains much less catalyst. The level of L can be independently controlled and raised or lowered at will by modifying the relative rates of catalyst feed and withdrawal via draw-off pipe 12. To restore the activity of the catalyst a portion of the same is withdrawn continuously from the reactor and regenerated. To this end, the fouled catalyst leaves the reactor 2 via line 12 and is discharged into air stream 13 wherein it is suspended and thereafter it is conveyed through transfer line 3 to regenerator 1 where a "fluid" mass of catalyst in regeneration gas is formed by regulating the linear velocity of the gas within the limits of from about ½ to 10 feet per second, preferably from 1 to 3 feet per second. As in the case of the reactor 2 an upper dense phase level of catalyst in gas is formed at $L_2$ above which the gas contains less catalyst. The flue gas is forced through "cyclones" 19 where catalyst is removed and then exits through pipes 20 and 21. The flue gas may be cooled by passage through cooler 23 thence passed through an electrical precipitator 24 to remove catalyst fines and finally exits to stack 30. A portion of the recovered catalyst fines may be passed via line 31 into air line 14 for delivery to the regenerator 1 if that be desired or necessary.

We have given a brief description of a plant producing butylene continuously to render our improvements understandable and clear, but as stated, the improvements go only to the method of regeneration. We shall show the effect of restricting the per cent of $CO_2$ in the exit gas from regeneration. In the below runs the catalyst used was a regenerated catalyst which has been revivified by burning of the contaminants at around 1100–1150° F. in the regeneration zone using air.

We now set forth conditions and results of test we performed in dehydrogenating butane which show the utility of our invention:

| | L | M |
|---|---|---|
| Feed | Normal Butane | |
| Per cent $CO_2$ in Exit Regeneration Gas | 13.5 | 5.1 |
| Reaction Temp., ° F | 1005 | 1000 |
| Feed Rate, W/Hr./W¹ | 0.45 | 0.44 |
| Cat./Feed, Ratio | 19.4 | 21.2 |
| Conversion, Vol. per cent | 19 | 30 |
| Yield of Butylenes, Vol. per cent | 9 | 22 |
| Selectivity, Vol. per cent | 47 | 73 |
| Pressure, lbs./sq. in | 7.0 | 7.2 |

¹ Lbs. of Butane per hour per lb. of Catalyst.

It will be noted that the above runs which we have designated L and M, respectively, were made at substantially the same pressure and temperature, feed rate per unit of catalyst holdup and catalyst to feed ratio, but in run M the conversion and selectivity and therefore yield of butylenes were considerably higher than the run L.

It is to be understood that the specific example set forth above is merely illustrative of our invention and that the invention includes the dehydrogenation of paraffinic hydrocarbons, generally, including the dehydrogenation of paraffins to the corresponding mono-olefins, as well as the dehydrogenation of mono-olefins to diolefins, as where butene is dehydrogenated to form butadiene, and/or the dehydrogenation of alkylated aromatics to the corresponding olefins as where ethylbenzene is dehydrogenated to styrene.

To review briefly, our present invention relates to improvement in the dehydrogenation of hydrocarbons. This field of hydrocarbon manufacture has become very important in recent years for it provides the first step in forming the olefins which may be used to alkylate isoparaffins and/or it forms the mono-olefins which may be subsequently further dehydrogenated in the second process such as that described in the application of Kenneth K. Kearby, Serial No. 430,543, filed February 12, 1942, which has issued as Patent No. 2,384,311, Sept. 4, 1945, where, for example, butene-2 was dehydrogenated to form butadiene, a valuable intermediate in the production of synthetic rubber and rubber-like materials.

We have found that the catalyst in our process which, of course, becomes contaminated with carbonaceous deposits during dehydrogenation of the paraffins and which must therefore be intermittently regenerated to remove these contaminants can be maintained at a higher level of activity if, during the regeneration of the catalyst, the concentration of $CO_2$ in the gases issuing from the regeneration zone be maintained at a low level, say not above 10 per cent and preferably around 5 per cent by volume.

While not wishing to be bound by any theory or theories as to the principle upon which our invention is bottomed, we believe there are two possible explanations for the improvement which we have shown in the activity and selectivity of dehydrogenation catalysts, as follows:

1. Where there is an excess of $CO_2$ in the gases exiting from the regeneration zone, it may be that the $CO_2$ "blankets" the catalyst. That is to say, the partial pressure of the $CO_2$ may be sufficiently high so that substantial quantities of it are adsorbed by the catalyst as it leaves the regeneration zone and passes to the reaction zone and this adsorbed $CO_2$ in some manner interferes with the dehydrogenation.

2. A second explanation may be that the presence of $CO_2$ in substantially large quantities in the regeneration fumes indicates that the active component of the catalyst, say the chromium oxide, has been deprived of sufficient oxygen to convert it to its most active state, namely, its state of highest chemical valence.

Numerous modifications of our invention falling within the scope thereof may be made by those who are familiar with the hydrocarbon dehydrogenation art.

What we claim is:

1. The method of dehydrogenating butane which comprises charging said butane to a reaction zone where it contacts a body of fluidized powdered dehydrogenation catalyst, permitting the butane to remain resident in the reaction zone at dehydrogenation temperatures for a sufficient period of time to effect dehydrogenation, withdrawing fouled catalyst from the reaction zone, conveying it to a regeneration zone, contacting the fouled catalyst with a free oxygen-containing gas while the said catalyst is maintained in fluidized condition in said regeneration zone for a sufficient period of time to effect regeneration of said catalyst, and conducting the regeneration under conditions such that the regeneration fumes exiting from the regeneration zone at all times contain less than about 10 volume per cent of $CO_2$.

2. The method set forth in claim 1 in which a greater quantity of oxygen is fed to the regeneration zone than is theoretically necessary to burn the contaminants on the fouled catalyst thus causing the flue gases issuing from the regeneration zone to contain less than 10 volume per cent of carbon dioxide.

3. The method set forth in claim 1 in which sufficient excess oxygen is fed to the regeneration zone to cause the flue gases issuing from the said zone to contain about 5 volume per cent of $CO_2$.

4. The method set forth in claim 1 in which the catalyst in the regeneration zone contains a minimum quantity of occluded $CO_2$ as it enters the said reaction zone.

KENNETH C. LAUGHLIN.
HENRY J. OGORZALY.

REFERENCES CITED

The following references are of record in the file of this patent:

UNITED STATES PATENTS

| Number | Name | Date |
|---|---|---|
| 1,908,338 | Franceway | May 9, 1933 |
| 2,290,845 | Voorhees | July 21, 1942 |
| 2,304,183 | Layng et al. | Dec. 8, 1942 |
| 2,325,136 | Kassel | July 27, 1943 |
| 2,356,697 | Rial | Aug. 22, 1944 |
| 2,358,039 | Thomas et al. | Sept. 12, 1944 |
| 2,368,507 | Welty, Jr. | Jan. 30, 1945 |

FOREIGN PATENTS

| Number | Country | Date |
|---|---|---|
| 119,350 | Australia | Dec. 31, 1942 |